(12) United States Patent
Lee et al.

(10) Patent No.: US 12,098,231 B2
(45) Date of Patent: Sep. 24, 2024

(54) POLYOLEFIN

(71) Applicant: LG Chem, Ltd., Seoul (KR)

(72) Inventors: Sung Min Lee, Daejeon (KR);
Jeongkyu Lee, Daejeon (KR);
Jinyoung Lee, Daejeon (KR); Sung Ho Park, Daejeon (KR); Seyoung Kim, Daejeon (KR); Ilhak Bae, Daejeon (KR)

(73) Assignee: LG Chem, Ltd., Seoul (KR)

( * ) Notice: Subject to any disclaimer, the term of this patent is extended or adjusted under 35 U.S.C. 154(b) by 237 days.

(21) Appl. No.: 17/778,110

(22) PCT Filed: Nov. 20, 2020

(86) PCT No.: PCT/KR2020/016439
§ 371 (c)(1),
(2) Date: May 19, 2022

(87) PCT Pub. No.: WO2021/118103
PCT Pub. Date: Jun. 17, 2021

(65) Prior Publication Data
US 2022/0372199 A1     Nov. 24, 2022

(30) Foreign Application Priority Data

Dec. 12, 2019 (KR) .................. 10-2019-0165771

(51) Int. Cl.
C08F 297/08 (2006.01)
C08F 4/02 (2006.01)
C08F 4/642 (2006.01)
C08F 210/10 (2006.01)

(52) U.S. Cl.
CPC ............ *C08F 297/083* (2013.01); *C08F 4/02* (2013.01); *C08F 4/6428* (2013.01); *C08F 2420/07* (2021.01)

(58) Field of Classification Search
CPC .......................... C08F 297/083; C08F 210/16
See application file for complete search history.

(56) References Cited

U.S. PATENT DOCUMENTS

| | | |
|---|---|---|
| 2005/0176901 A1 | 8/2005 | Arai et al. |
| 2008/0276717 A1 | 11/2008 | Teh et al. |
| 2010/0121006 A1 | 5/2010 | Cho et al. |
| 2011/0165419 A1 | 7/2011 | Kumamoto |
| 2013/0035458 A1 | 2/2013 | Martin et al. |

(Continued)

FOREIGN PATENT DOCUMENTS

| | | |
|---|---|---|
| JP | H09235313 A | 9/1997 |
| JP | 2006274159 A | 10/2006 |

(Continued)

OTHER PUBLICATIONS

Zhang, Fajun, et al., "Polydispersity of Ethylene Sequence Length in Metallocene Ethylene/a-Olefin Copolymers. I. Characterized by Thermal-Fractionation Technique." Journal of Polymer Science: Part B: Polymer Physics, vol. 40, Feb. 4, 2002, pp. 813-821.

(Continued)

*Primary Examiner* — Catherine S Branch
(74) *Attorney, Agent, or Firm* — Lerner David LLP

(57) ABSTRACT

This invention relates to polyolefin. More specifically, this invention relates to polyolefin that has small copolymer content, but exhibits excellent mechanical properties.

9 Claims, 2 Drawing Sheets

(56) References Cited

U.S. PATENT DOCUMENTS

| | | |
|---|---|---|
| 2015/0094418 A1 | 4/2015 | Wang et al. |
| 2016/0229932 A1 | 8/2016 | Severn et al. |
| 2018/0201638 A1 | 7/2018 | Piao et al. |
| 2019/0161560 A1 | 5/2019 | Yang et al. |
| 2021/0002463 A1 | 1/2021 | Jeon et al. |
| 2021/0115236 A1 | 4/2021 | Lee et al. |

FOREIGN PATENT DOCUMENTS

| | | |
|---|---|---|
| JP | 2008247944 A | 10/2008 |
| JP | 2016534168 A | 11/2016 |
| KR | 20080097949 A | 11/2008 |
| KR | 20170008987 A | 1/2017 |
| KR | 20170075529 A | 7/2017 |
| KR | 20170105407 A | 9/2017 |
| KR | 20180052422 A | 5/2018 |
| WO | 2013040676 A1 | 3/2013 |
| WO | 2019117443 A1 | 6/2019 |
| WO | 2019194547 A1 | 10/2019 |

OTHER PUBLICATIONS

Search report from International Application No. PCT/KR2020/016439, mailed Feb. 26, 2021.

Kong, Jie, et al., "Study on Molecular Chain Heterogeneity of Linear Low-Density Polyethylene by Cross-Fractionation of Temperature Rising Elution Fractionation and Successive Self-Nucleation/Annealing Thermal Fractionation." Journal of Applied Polymer Science, vol. 94, May 15, 2004, pp. 1710-1718.

Meng, Weijuan, et al., "The Effect of Comonomer Type and Content on the Properties of Ziegler-Natta Bimodal High-Density Polyethylene." Journal of the Korean Chemical Society, vol. 55, No. 4, Jun. 22, 2011, pp. 673-679.

Extended European Search Report for Application No. 20898741.2 mailed Oct. 20, 2022. 9 pgs.

POLYOLEFIN

CROSS-REFERENCE TO RELATED APPLICATIONS

The present application is a national stage entry under 35 U.S.C. § 371 of International Application No. PCT/KR2020/016439 filed on Nov. 20, 2020, which claims priority from Korean Patent Application No. 10-2019-0165771 filed on Dec. 12, 2019, all the disclosures of which are incorporated herein by reference.

BACKGROUND OF THE INVENTION

(a) Field of the Invention

This invention relates to polyolefin. More specifically, this invention relates to polyolefin that has small copolymer content, but exhibits excellent mechanical properties.

(b) Description of the Related Art

Linear low density polyethylene (LLDPE) is prepared by copolymerization of ethylene and alpha olefin at low pressure using a polymerization catalyst, and it has narrow molecular weight distribution and short chain branches (SCB) of a certain length, and does not have long chain branches. A linear low density polyethylene film has high elongation and breaking strength, excellent tear strength and dart drop impact strength, as well as general properties of polyethylene, and thus, the use is increasing in stretch films, overlap films, and the like, for which the existing low density polyethylene or high density polyethylene cannot be applied.

Meanwhile, as the density of linear low density polyethylene is lower, mechanical properties increase. However, if a lot of comonomers are used to prepare low density polyethylene, process may become unstable such as frequent generation of fouling, or productivity may be lowered.

Thus, there is a demand for the development of polyethylene that has low density with stable productivity, but can realize excellent mechanical properties.

SUMMARY OF THE INVENTION

In order to solve the problem of the prior art, it is an object of the invention to provide polyolefin that has low density and low melting point compared to polyolefin resin having similar SCB content, and thus, can stably produce low density product even with small comonomer content.

In order to achieve the object, there is provided polyolefin having density of 0.910 g/cm³ to 0.930 g/cm³;
SCBs (Short Chain Branch) per 1000 carbons of 1.0 to 5.0; and
block comonomer distribution index (BCDI) calculated by the following Formula 1 of 1.0 or less:

$$BCDI = \frac{ASLfi(<8\ nm) + ASLfi(>30\ nm)}{ASLfi(8 \sim 30\ nm)} \quad \text{[Formula 1]}$$

in the Formula 1,
ASL fi(<8 nm) is the fraction (%) of chains having ASL (Average Ethylene Sequence Length) less than 8 nm, by SSA (Successive Self-nucleation and Annealing) analysis,
ASL fi(>30 nm) is the fraction (%) of chains having ASL greater than 30 nm, by SSA analysis, and
ASL fi(8~30 nm) is the fraction (%) of chains having ASL of 8 to 30 nm, by SSA analysis.

According to this invention, by controlling the distribution degree of ethylene sequence forming lamellar during polymerization of polyolefin using a metallocene catalyst, polyolefin that exhibits low density and melting temperature (Tm) compared to the existing polyolefin having similar SCB content, and thus, has excellent mechanical properties, can be provided.

And, even if a small amount of alpha olefin comonomers are introduced, polyolefin having desired properties can be stably prepared, thereby improving polymerization productivity.

DETAILED DESCRIPTION OF THE EMBODIMENTS

Figure 1:
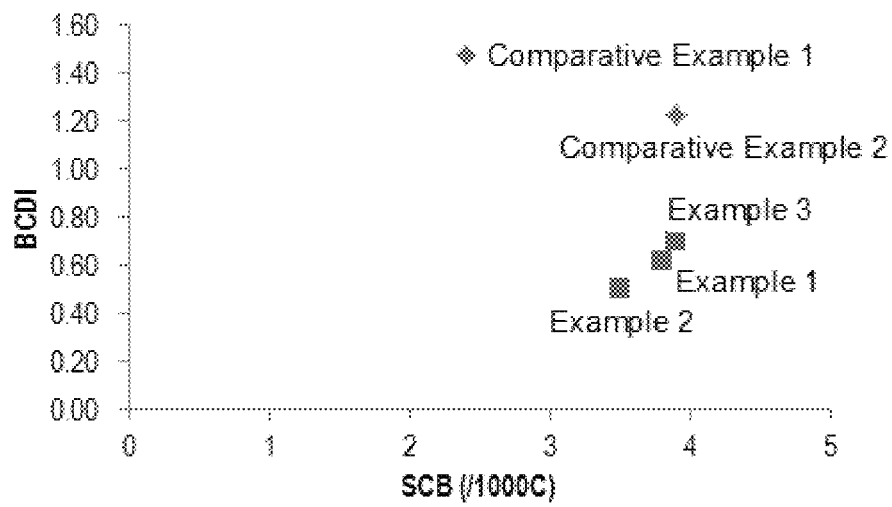
FIG. 1 is a graph showing the relation between the SBC contents and BCDIs of polyolefins according to Examples of the invention and Comparative Examples.

As used herein, terms "a first", "a second" and the like are used to explain various constructional elements, and they are used only to distinguish one constructional element from other constructional elements.

And, the terms used herein are only to explain specific embodiments, and are not intended to limit the present invention. A singular expression includes a plural expression thereof, unless it is expressly stated or obvious from the context that such is not intended. As used herein, the terms "comprise" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to the invention and the invention may have various forms, specific examples will be illustrated and explained in detail below. However, it should be understood that these are not intended to limit the invention to specific disclosure, and that the present invention includes all the modifications, equivalents or replacements thereof without departing from the spirit and technical scope of the invention.

Hereinafter, polyolefin according to specific embodiments of the invention will be explained in detail.

Polyolefin according to one embodiment of the present invention is characterized in that density is 0.910 g/cm³ to 0.930 g/cm³; SCBs (Short Chain Branch) per 1000 carbons are 1.0 to 5.0; and block comonomer distribution index (BCDI) calculated by the following Formula 1 is 1.0 or less:

$$BCDI = \frac{ASLfi(<8\ nm) + ASLfi(>30\ nm)}{ASLfi(8 \sim 30\ nm)} \quad \text{[Formula 1]}$$

in the Formula 1,

ASL fi(<8 nm) is the fraction (%) of chains having ASL (Average Ethylene Sequence Length) less than 8 nm, by SSA (Successive Self-nucleation and Annealing) analysis, ASL fi(>30 nm) is the fraction (%) of chains having ASL greater than 30 nm, by SSA analysis, and ASL fi(8~30 nm) is the fraction (%) of chains having ASL of 8 to 30 nm, by SSA analysis.

Linear low density polyethylene (LLDPE) is prepared by copolymerization of ethylene and alpha olefin at low pressure using a polymerization catalyst, and has narrow molecular weight distribution, and short chain branch of a certain length. A linear low density polyethylene film has high breaking strength and elongation, excellent tear strength and dart drop impact strength, as well as general properties of polyethylene, and thus, the use is increasing in stretch films, overlap films, and the like, for which the existing low density polyethylene or high density polyethylene cannot be applied.

Meanwhile, it is known that as the density of linear low density polyethylene is lower, dart drop impact strength increases. However, if a lot of comonomers are used to prepare low density polyethylene, fouling may be frequently generated in a slurry polymerization process, and when preparing a film comprising the same, the amount of an antiblocking agent used should be increased due to stickiness. And, the production process may be unstable, or the morphology of produced polyethylene may be deteriorated, thus decreasing bulk density.

Thus, in the present disclosure, by appropriately controlling the distribution of ethylene sequence forming lamellar, products having desired low density, high copolymerizability can be produced while maintaining the content of comonomers relatively low. Thereby, deterioration of the morphology properties of produced polyethylene may be prevented, and volume density may be improved to decrease fouling risk, thus improving productivity.

SCB (Short Chain Branch) means side branch having a carbon number of 2 to 6 (per 1000 carbons of olefinic polymer main chain) attached to the main chain of olefinic polymer, and commonly means side branches made when alpha olefins having carbon numbers of 4 or more, such as 1-butene, 1-hexene, 1-octene, and the like, are used as comonomers. Such SCB number (number/1000 C) can be measured using $^1$H-NMR.

Specifically, polyolefin according to one embodiment of the invention satisfies a density of 0.910 g/cm$^3$ to 0.930 g/cm$^3$; SCBs (Short Chain Branch) per 1000 carbons of 1.0 to 5.0; and block comonomer distribution index (BCDI) calculated by the following Formula 1, of 1.0 or less:

$$BCDI = \frac{ASLfi(<8\text{ nm}) + ASLfi(>30\text{ nm})}{ASLfi(8\sim30\text{ nm})} \quad [\text{Formula 1}]$$

in the Formula 1,

ASL fi(<8 nm) is the fraction (%) of chains having ASL (Average Ethylene Sequence Length) less than 8 nm, by SSA (Successive Self-nucleation and Annealing) analysis, ASL fi(>30 nm) is the fraction (%) of chains having ASL greater than 30 nm, by SSA analysis, and ASL fi(8~30 nm) is the fraction (%) of chains having ASL of 8 to 30 nm, by SSA analysis.

According to one embodiment of the invention, the polyolefin may be, for example, copolymer of ethylene and alpha olefin. Wherein, the alpha olefin may comprise propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbordene, phenyl norbordene, vinyl norbordene, dicyclopentadiene, 1,4-butadiene, 1,5-pentadiene, 1,6-hexadiene, styrene, alpha-methyl styrene, divinylbenzene, and 3-chloromethyl styrene. Among them, the polyolefin may be copolymer of ethylene and 1-butene, copolymer of ethylene and 1-hexene, or copolymer of ethylene and 1-octene.

More specifically, according to one embodiment, the density of polyolefin may be 0.910 g/cm$^3$ or more, or 0.915 g/cm$^3$ or more, or 0.916 g/cm$^3$ or more, or 0.917 g/cm$^3$ or more, or 0.918 g/cm$^3$ or more, or, or 0.919 g/cm$^3$ or more, and 0.930 g/cm$^3$ or less, or 0.928 g/cm$^3$ or less, or 0.927 g/cm$^3$ or less, or 0.925 g/cm$^3$ or less, or 0.922 g/cm$^3$ or less, or 0.921 g/cm$^3$ or less, or 0.920 g/cm$^3$ or less. Wherein the density is a value measured according to ASTM D1505.

And, the polyolefin according to one embodiment of the invention may have a number of SCB (Short Chain Branch, side branch having a carbon number of 6 or less, introduced in the main chain of polyolefin) per 1000 carbons, of 1.0 or more, or 1.5 or more, or 2.0 or more, and 5.0 or less, or 4.5 or less, or 4.0 or less. The number of SBC is measured by $^1$H-NMR.

The polyolefin disclosed herein is semi-crystalline polymer, and may include a crystalline part and an amorphous part. Specifically, polymer chains comprising ethylene repeat units are folded to make a bundle, thereby forming a crystalline block (or segment) in the form of lamella.

This invention is based on the discovery that when block comonomer distribution index (BCDI) quantifying the distribution of lamellar crystals in polymer chains is 1.0 or less, compared to the existing polyolefin having similar SCB content, low density and melting temperature are exhibited, and thus, polyolefin resin having a density corresponding to product specification can be produced even with a small amount of comonomers.

For example, the polyolefin of one embodiment of the invention having SCB per 1000 carbons of 1.0 to 5.0, and block comonomer distribution index (BCDI) of 1.0 or less may exhibit lower density and melting temperature than the existing polyolefins having equal SCB content ranges.

The polyolefin according to one embodiment of the invention has block comonomer distribution index (BCDI) calculated by the following Formula 1, of 1.0 or less.

$$BCDI = \frac{ASLfi(<8\text{ nm}) + ASLfi(>30\text{ nm})}{ASLfi(8\sim30\text{ nm})} \quad [\text{Formula 1}]$$

in the Formula 1,

ASL fi(<8 nm) is the fraction (%) of chains having ASL (Average Ethylene Sequence Length) less than 8 nm, by SSA (Successive Self-nucleation and Annealing) analysis, ASL fi(>30 nm) is the fraction (%) of chains having ASL greater than 30 nm, by SSA analysis, and ASL fi(8~30 nm) is the fraction (%) of chains having ASL of 8 to 30 nm, by SSA analysis.

Preferably, the block comonomer distribution index (BCDI) calculated by the Formula 1 may be 0.9 or less, or 0.8 or less, or 0.7 or less, and 0.4 or more, or 0.5 or more.

SSA (Successive Self-nucleation and Annealing) is a method of quenching every time each stage ends while decreasing temperature by stages using Differential Scanning calorimeter (DSC), thereby preserving crystals crystallized at the corresponding temperature every stage.

Specifically, if polyolefin is heated and completely molten, and then, cooled to a specific temperature (T) and gradually annealed, lamellae unstable at the corresponding temperature (T) are still molten and only stable lamellae are crystallized. Wherein, the stability to the corresponding temperature (T) depends on the thickness of lamella, and the thickness of lamella depends on the structure of chain. Thus, by progressing heat treatment by stages, the thickness and distribution degree of lamellae according to the structure of polymer chain can be measured quantitatively, and thus, distribution of each melting peak area can be measured.

According to one embodiment of the invention, SSA may be conducted using DSC, by heating the polyolefin to the first heating temperature of 120 to 124° C., maintaining for 15 to 30 minutes, and then, cooling to 28 to 32° C., and while decreasing heating temperature by stages with (n+1)th heating temperature being 3 to 7° C. lower than nth heating temperature, repeating heating-annealing-quenching until the final heating temperature becomes 50 to 54° C.

More specifically, SSA may be conducted by the following steps i) to v):
  i) heating polyolefin to 160° C. using DSC, and then, maintaining for 30 minutes to remove all the heat history before measurement;
  ii) decreasing temperature from 160° C. to 122° C., and then, maintaining for 20 minutes, decreasing temperature to 30° C., and maintaining for 1 minute;
  iii) heating to 117° C., which is 5° C. lower than 122° C., and then, maintaining for 20 minutes, decreasing temperature to 30° C., and maintaining for 1 minute;
  iv) while gradually decreasing the heating temperature at the identical temperature rise speed, maintenance time and cooling temperature, with (n+1)th heating temperature being 5° C. lower than nth heating temperature, repeating until the heating temperature becomes 52° C.; and
  v) finally, increasing the temperature from 30° C. to 160° C.

Figure 3:
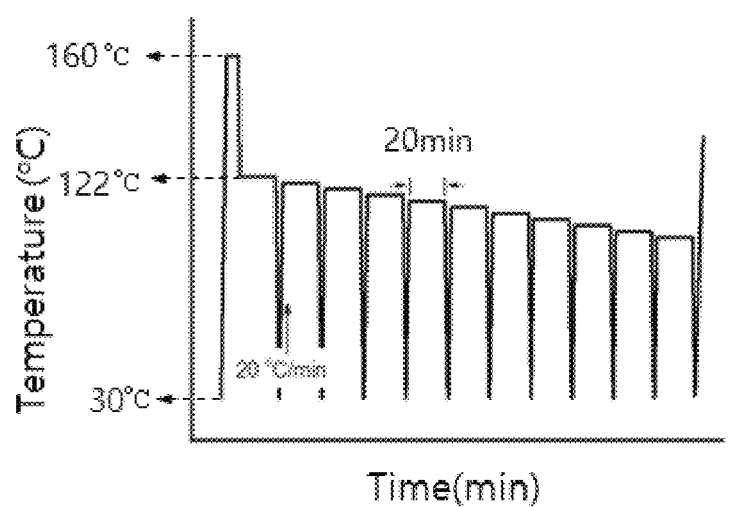
FIG. 3 shows the temperature profile of SSA analysis according to one embodiment of the invention.

The temperature profile of SSA analysis according to one embodiment of the invention is shown in FIG. 3.

Referring to FIG. 3, using differential scanning calorimeter (device name: DSC8000, manufacturing company: PerkinElmer), polyolefin is first heated to 160° C., and then, maintained for 30 minutes to remove all the heat history before measuring the sample. The temperature is decreased from 160° C. to 122° C., and then, maintained for 20 minutes, and decreased to 30° C. and maintained for 1 minute, and then, increased again.

Next, after heating to a temperature (117° C.) 5° C. lower than the first heating temperature of 122° C., the temperature is maintained for 20 minutes, decreased to 30° C. and maintained for 1 minute, and then, increased again. In this way, while gradually decreasing the heating temperature at the identical maintenance time and cooling temperature, with (n+1)th heating temperature being 5° C. lower than nth heating temperature, the process is repeated till 52° C. Wherein, the temperature increase speed and decrease speed are respectively controlled to 20° C./min. Finally, in order to quantitatively analyzing the distribution of crystals formed with repeated heating-annealing-quenching, while raising the temperature from 30° C. to 160° C. at the temperature rise speed of 10° C./min, calory change is observed to measure thermogram.

As such, if heating-annealing-quenching of the polyolefin are repeated by SSA method, and then, the temperature is increased, peaks appear according to temperature, and the ASL can be calculated from the measured SSA thermogram.

More specifically, ASL can be calculated by the following Formula 2, wherein $CH_2$ mole fraction means the mole ratio of consecutive ethylene in the whole polyolefin, and the mole ratio of ethylene can be calculated by the following Formula 3:

$$ASL = 0.2534(CH_2 \text{ mole fraction})/(1-CH_2 \text{ mole fraction}) \quad \text{[Formula 2]}$$

$$-\ln(CH_2 \text{ mole fraction}) = -0.331 + 135.5/Tm(K) \quad \text{[Formula 3]}$$

Tm is a melting temperature in polyolefin (unit: K), and it means herein peak temperatures of peaks according to temperature, obtained in SSA analysis.

For the explanations of the Formulas 2 and 3, and more specific calculation method of ASL, Journal of Polymer Science Part B: Polymer Physics. 2002, vol. 40, 813-821, and Journal of the Korean Chemical Society 2011. Vol. 55, No. 4 may be referred to.

By the above method, a fraction (%) of chains having ASL (Average Ethylene Sequence Length) less than 8 nm, a fraction (%) of chains having ASL greater than 30 nm, and a fraction (%) of chains having ASL of 8 to 30 nm can be respectively calculated, and they are substituted in the above Formula 1 to calculate block comonomer distribution index (BCDI).

The polyolefin according to one embodiment of the invention has block comonomer distribution index (BCDI) calculated by the above method, of 1.0 or less, and thus, due to the optimum crystal structure distribution, can realize low density and excellent mechanical properties, even with a small amount of comonomers.

And, in the Formula 1, ASL fi(<8 nm) may be 14% or more, or 17% or more, and 23% or less, or 20% or less.

And, in the Formula 1, ASL fi(>30 nm) may be 14% or more, or 17% or more, and 28% or less, or 24% or less.

And, in the Formula 1, ASL fi(8~30 nm) may be 51% or more, or 55% or more, and 75% or less, or 70% or less.

And, the polyolefin according to one embodiment of the invention may have melting temperature (Tm) of 124° C. or less, for example 124° C. or less, or 123.5° C. or less, or 123° C. or less, and 120° C. or more, or 120.5° C. or more, or 121.5° C. or more. By having the above range of melting temperature, it may exhibit improved processability.

And, the polyolefin according to one embodiment of the invention may have melt index ($MI_{2.16}$) measured under temperature of 190° C. and load of 2.16 kg according to ASTM D1238 of 0.5 to 1.5 g/10 min, while fulfilling the above explained properties. More specifically, the melt index ($MI_{2.16}$) may be 0.5 g/10 min or more, or 0.7 g/10 min or more, or 0.8 g/10 min or more, or 0.9 g/10 min or more, and 1.5 g/10 min or less, or 1.4 g/10 min or less, or 1.3 g/10 min or less.

And, the polyolefin according to one embodiment of the invention may have haze of a polyolefin film (BUR 2.3, film thickness 55 to 65 μm) prepared using a film applicator, measured according to ISO 13468, of 11% or less. More specifically, the haze of the polyolefin according to one embodiment of the invention may be 11% or less, or 10.5% or less, or 10% or less. As the haze value is lower, it is more excellent, and thus, the lower limit is not specifically limited, but for example, it may be 4% or more, or 5% or more, or 6% or more, or 7% or more.

And, the polyolefin according to one embodiment of the invention may have dart drop impact strength of 850 g or more, or 900 g or more, or 950 g or more, or 1000 g or more, measured according to ASTM D 1709 [Method A], after preparing a polyolefin film (BUR 2.3, film thickness 55 to 65 μm) using a film applicator. As the dart drop impact strength is higher, it is more excellent, and thus, the upper limit is not specifically limited, but for example, it may be 1,500 g or less, or 1,400 g or less, or 1,300 g or less, or 1,200 g or less.

As explained above, the polyolefin of the present disclosure not only exhibits improved transparency compared to the existing polyolefin having the equal range of density, but also exhibits excellent dart drop impact strength.

And, the polyolefin according to one embodiment of the invention may have weight average molecular weight (Mw) of 100,000 to 500,000 g/mol. More specifically, the weight average molecular weight may be 100,000 g/mol or more, or 150,000/mol or more, or 200,000/mol or more, and 500,000 g/mol or less, or 450,000 g/mol or less, or 400,000 g/mol.

The weight average molecular weight (Mw) is measured using gel permeation chromatography (GPC), and it means universal calibration value using a polystyrene standard, and may be appropriately controlled considering the use or application field of the polyolefin.

Meanwhile, the polyolefin according to one embodiment of the invention having the above-described properties may be prepared by a method comprising a step of polymerizing olefin monomers in the presence of a supported metallocene compound as the catalytically active component.

More specifically, the polyolefin of the present invention, although not limited thereto, may be prepared by polymerizing olefin monomers in the presence of a supported metallocene catalyst comprising a metallocene compound selected from compounds represented by the following Chemical Formula 1; and a carrier supporting the metallocene compound:

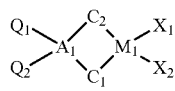

[Chemical Formula 1]

in the Chemical Formula 1, $M_1$ is a Group 4 transition metal;

$A_1$ is carbon (C), silicon (Si), or germanium (Ge);

$Q_1$ and $Q_2$ are identical to or different from each other, and each independently, hydrogen, halogen, $C_{1-20}$ alkyl, $C_{2-20}$ alkenyl, $C_{2-20}$ alkoxyalkyl, $C_{7-40}$ aryloxyalkyl, $C_{6-40}$ aryl, $C_{7-40}$ alkylaryl, or $C_{7-40}$ arylalkyl;

$X_1$ and $X_2$ are identical to or different from each other, and each independently, halogen, $C_{1-20}$ alkyl, $C_{2-20}$ alkenyl, $C_{6-40}$ aryl, a nitro group, an amido group, $C_{1-20}$ alkylsilyl, $C_{1-20}$ alkoxy, or $C_{1-20}$ sulfonate group;

$C_1$ and $C_2$ are identical to or different from each other, and each independently, represented by one of the following Chemical Formula 2a, 2b, or 2c,

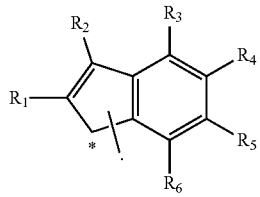

[Chemical Formula 2a]

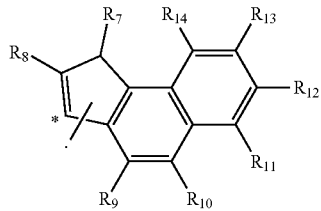

[Chemical Formula 2b]

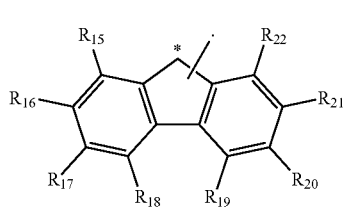

[Chemical Formula 2c]

in the Chemical Formulas 2a, 2b, and 2c, $R_1$ to $R_{22}$ are identical to or different from each other, and each independently, hydrogen, halogen, $C_{1-20}$ alkyl, $C_{1-20}$ haloalkyl, $C_{2-20}$ alkenyl, $C_{1-20}$ alkylsilyl, $C_{1-20}$ silylalkyl, $C_{1-20}$ alkoxysilyl, $C_{1-20}$ alkoxy, $C_{6-40}$ aryl, $C_{7-40}$ alkylaryl, or $C_{7-40}$ arylalkyl, and two or more neighboring groups of $R_{15}$ to $R_{22}$ may be connected with each other to form a substituted or unsubstituted aliphatic or aromatic ring; and

* represents a site binding to $A_1$,
· represents a site binding to $M_1$.

In the supported metallocene catalyst, the substituents of the Chemical Formula 1 will be explained in detail.

The C1 to C20 alkyl group may include a liner or branched alkyl group, and specifically, may include a methyl group, an ethyl group, a propyl group, an isopropyl group, an n-butyl group, a tert-butyl group, a pentyl group, a hexyl group, a heptyl group, an octyl group, and the like, but is not limited thereto.

The C2 to C20 alkenyl group may include a linear or branched alkenyl group, and specifically, may include an allyl group, an ethenyl group, a propenyl group, a butenyl group, a pentenyl group, and the like, but is not limited thereto.

The C6 to C20 aryl group may include a monocyclic or condensed aryl ring group, and specifically, it may include a phenyl group, a biphenyl group, a naphthyl group, a phenanthrenyl group, a fluorenyl group, and the like, but is not limited thereto.

The C1 to C20 alkoxy group may include a methoxy group, an ethoxy group, a phenyloxy group, a cyclohexyloxy group, and the like, but is not limited thereto.

The C2 to C20 alkoxyalkyl group is a functional group wherein one or more hydrogen atoms of the above explained alkyl group are substituted with an alkoxy group, and specifically, it may include an alkoxyalkyl group such as a methoxymethyl group, a methoxyethyl group, an ethoxymethyl group, an iso-propoxymethyl group, an iso-propoxyethyl group, an iso-propoxyhexyl group, a tert-butoxymethyl group, a tert-butoxyethyl group, a tert-butoxyhexyl group, and the like; or an aryloxyalkyl group such as a phenoxyhexyl group, and the like, but is not limited thereto.

The C1 to C20 alkylsilyl group or C1 to C20 alkoxysilyl group is a functional group wherein 1 to 3 hydrogen atoms of —SiH$_3$ are substituted with the above explained alkyl group or alkoxy group, and specifically, may include an alkylsilyl group such as a methylsilyl group, a dimethylsilyl group, a trimethylsilyl group, a dimethylethylsilyl group, a diethylmethylsilyl group or a dimethylpropylsilyl group; an alkoxysilyl group such as a methoxysilyl group, a dimethoxysilyl group, a trimethoxy silyl group or a dimethoxyethoxysilyl group, and the like; an alkoxyalkylsilyl group such as a methoxydimethylsilyl group, a diethoxymethylsilyl group, or a dimethoxypropylsilyl group, and the like, but is not limited thereto.

The C1 to C20 silylalkyl is a functional group wherein one or more hydrogen atoms of the above explained alkyl group are substituted with a silyl group, and specifically, may include —CH$_2$—SiH$_3$, a methylsilylmethyl group, or a dimethylethoxysilylpropyl group, and the like, but is not limited thereto.

The halogen may be fluorine (F), chlorine (Cl), bromine (Br), or iodine (I).

The sulfonate group has a structure of —O—SO$_2$—R' wherein R' may be a C1-C20 alkyl group. Specifically, the C1 to C20 sulfonate group may include a methanesulfonate group or a phenylsulfonate group, and the like, but is not limited thereto.

And, as used herein, the description "two neighboring substituents are connected with each other to form an aliphatic or aromatic ring" means that atom(s) of two substituents and atom(s) to which the two substituents bond are connected with each other to form a ring.

The above explained substituents may be optionally substituted with one or more substituents selected from the group consisting of a hydroxyl group; halogen; an alkyl group, an alkenyl group, an aryl group, or an alkoxy group; an alkyl group, an alkenyl group, an aryl group, or an alkoxy group including one or more hetero atoms of Group 14 to Group 16; a silyl group; an alkylsilyl group or an alkoxysilyl group; a phosphine group; a phosphide group; a sulfonate group; and a sulfone group.

As the Group 4 transition metal, titanium (Ti), zirconium (Zr), hafnium (Hf), and the like may be mentioned, but is not limited thereto.

Using the supported catalyst comprising a metallocene compound of the Chemical Formula 1, the distribution degree of ethylene sequence forming lamellar according to length can be controlled during polymerization of polyolefin, and thus, polyolefin having low melting temperature and density compared to the existing polyolefin having similar SCB content can be prepared.

In general, the lower a density, more excellent mechanical properties, but in case a lot of comonomers are introduced in a process so as to produce low density product, the process may become unstable, and settling efficiency may be deteriorated. Since the polyolefin has low density and melting temperature even with similar SCB content, it can produce low density product even with the introduction of relatively small amount of comonomers.

More specifically, in the supported catalyst according to one embodiment of the invention, the metallocene compound represented by the Chemical Formula 1 comprises an indenyl ligand, a fluorenyl ligand, or a cyclopentadienyl ligand as different ligands, wherein the ligands are cross-linked by -A$_1$(Q$_1$)(Q$_2$)—, and M$_1$(X$_1$)(X$_2$) exists between the ligands. If polyolefin is polymerized using a catalyst having such a structure, compared to prior art polyolefin having the equal amount of SCB, the inventive polyolefin having low melting point, wherein lamellar crystalline structure is randomly distributed, can be obtained.

Specifically, combination of different ligands in the structure of a metallocene compound represented by the Chemical Formula 1 may have an influence on the polymerization activity of polyolefin and copolymerizability of comonomers. And, the degree of steric hindrance effect can be controlled according to the kind of ligands and the kind of substituted functional groups of the metallocene compound represented by the Chemical Formula 1, thus controlling the lamellar distribution of prepared polyolefin.

And, in the structure of a metallocene compound represented by the Chemical Formula 1, the ligand of the Chemical Formula 2a to 2c may be cross-linked by -A$_1$(Q$_1$)(Q$_2$)- to exhibit excellent stability. In order to secure such effect more effectively, each of Q$_1$ and Q$_2$ may be independently, one of a C1 to C20 alkyl group or a C6 to C20 aryl group. More specifically, a metallocene compound wherein Q$_1$ and Q$_2$ are each independently, one of methyl, ethyl, n-propyl, iso-propyl, n-butyl, t-butyl, phenyl, and benzyl, may be used.

In the structure of the metallocene compound represented by the Chemical Formula 1, M$_1$(X$_1$)(X$_2$) existing between the cyclopentadienyl ligand and tetrahydroindenyl ligand may have an influence on the storage stability of metal complex. In order secure the effect more effectively, X$_1$ and X$_2$ may be each independently, halogen, a C1 to C20 alkyl group, or a C1 to C20 alkoxy group. More specifically, X$_1$ and X$_2$ may be each independently, F, Cl, Br or I, and M$_1$ may be Ti, Zr or Hf; preferably Zr or Hf; or more preferably Zr.

The metallocene compound of the Chemical Formula 1 may be one of compounds represented by the following structural formulas, but is not limited thereto.

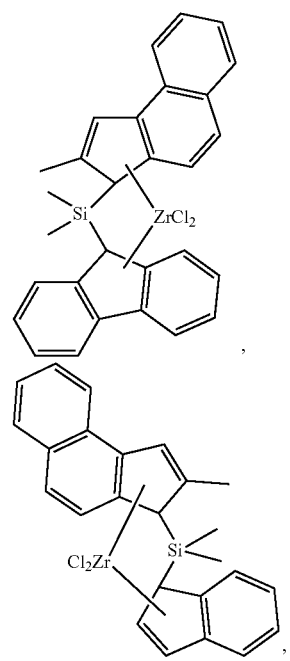

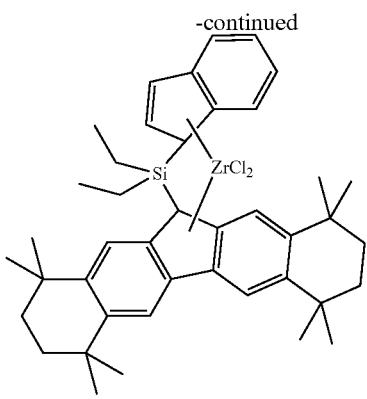

The metallocene compound represented by the Chemical Formula 1 may be synthesized applying known reactions. Specifically, it may be prepared by connecting the structures of the Chemical Formula 2a, 2b, or 2c by a bridge compound to prepare a ligand compound, and then, introducing a metal precursor compound to conduct metallation, but the method is not limited thereto, and for more detailed synthesis method, examples may be referred to.

Meanwhile, since the metallocene compound has the above explained structural characteristics, it can be stably supported in a carrier.

As the carrier, carriers containing hydroxyl groups or siloxane groups on the surface may be used. Specifically, as the carrier, those dried at high temperature to remove moisture on the surface, thus containing highly reactive hydroxyl groups or siloxane groups may be used. More specifically, as the carrier, silica, alumina, magnesia or a mixture thereof may be used, and among them, silica may be more preferable. The carrier may be dried at high temperature, and for example, high temperature dried silica, silica-alumina, or silica-magnesia, and the like may be used, which may commonly comprise oxide, carbonate, sulfate, nitrate components such as $Na_2O$, $K_2CO_3$, $BaSO_4$ and $Mg(NO_3)_2$, and the like.

The drying temperature of the carrier may be preferably about 200 to 800° C., more preferably about 300 to 600° C., and most preferably about 300 to 400° C. If the drying temperature of the carrier is less than about 200° C., surface moisture may react with a cocatalyst, and if it is greater than about 800° C., pores on the surface of the carrier may be combined to decrease surface area, and surface hydroxyl groups may disappear and only siloxane groups may remain, and thus, reaction sites with a cocatalyst may decrease.

The amount of hydroxyl groups on the surface of the carrier may be preferably about 0.1 to 10 mmol/g, and more preferably, about 0.5 to 5 mmol/g. The amount of hydroxyl groups on the surface of the carrier may be controlled by the preparation method and conditions or drying conditions of the carrier, for example, temperature, time, vacuum or spray drying, and the like.

If the amount of hydroxy groups is less than about 0.1 mmol/g, reaction sites with a cocatalyst may be few, and if it is greater than about 10 mmol/g, they may be derived from moisture other than hydroxyl groups existing on the surface of the carrier particles, which is not preferable.

And, in the supported metallocene catalyst of one embodiment, a cocatalyst supported together in the carrier so as to activate the metallocene compound is not specifically limited as long as it is an organic metal compound including Group 13 metal and can be used for olefin polymerization in the presence of a common metallocene catalyst.

Specifically, the cocatalyst compound may comprise one or more of an aluminum-containing first cocatalyst of the following Chemical Formula 3, and a borate-based second cocatalyst of the following Chemical Formula 4

$$R_a-[Al(R_b)-O]_n-R_c$$ [Chemical Formula 3]

In the Chemical Formula 3, $R_a$, $R_b$, and $R_c$ are identical to or different from each other, and each independently, hydrogen, halogen, a C1 to C20 hydrocarbyl group, or a C1 to C20 hydrocarbyl group substituted with halogen;

n is an integer of 2 or more;

$$T^+[BG_4]^-$$ [Chemical Formula 4]

In the Chemical Formula 4, $T^+$ is +1 valent polyatomic ion, B is boron in +3 oxidation state, G's are each independently, selected from the group consisting of a hydride group, a dialkylamido group, a halide group, an alkoxide group, an aryloxide group, a hydrocarbyl group, a halocarbyl group and a halo-substituted hydrocarbyl group, and G has 20 or less carbons, provided that G is a halide group at one or less position.

The first cocatalyst of the Chemical Formula 3 may be an alkylaluminoxane-based compound in which repeat units bond in linear, circular or network shape, and specific examples of the first cocatalyst may include methylaluminoxane (MAO), ethylalulminoxane, isobutylaluminoxane, butylaluminoxane, and the like.

And, the second cocatalyst of the Chemical Formula 4 may be a borate-based compound in the form of tri-substituted ammonium salt, or dialkyl ammonium salt, or tri-substituted phosphonium salt. As specific examples of the second cocatalyst, borate-based compounds in the form of tri-substituted ammonium salt, such as trimethylammonium tetraphenylborate, methyldioctadecylammonium tetraphenylborate, triethylammonium tetraphenylborate, tripropylammonium tetraphenylborate, tri(n-butyl)ammonium tetraphenylborate, methyl tetradecyl octadecyl ammonium tetraphenylborate, N,N-dimethylanilinium tetraphenylborate, N,N-diethylanilinium tetraphenylborate, N,N-dimethyl(2,4,6-trimethylanilinium)tetraphenylborate, trimethylammonium tetrakis(pentafluorophenyl)borate, methylditetradecylammonium tetrakis(pentafluorophenyl)borate, methyldioctadecylammonium tetrakis(pentafluorophenyl)borate, triethylammonium tetrakis(pentafluorophenyl)borate, tripropylammonium tetrakis (pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl(2,4,6-trimethylanilinium)tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate, and N,N-dimethyl-(2,4,6-trimethylanilinium)tetrakis-(2,3,4,6-tetrafluorophenyl)borate; borate-based compounds in the form of dialkylammonium salt, such as dioctadecylammonium tetrakis(pentafluorophenyl)borate, ditetradecylammonium tetrakis(pentafluorophenyl)borate and dicyclohexylammonium tetrakis(pentafluorophenyl)borate; and borate-based compounds in the form of trisubstituted phosphonium salt, such as triphenylphosphonium tetrakis(pentafluorophenyl)borate, methyloctadecylphosphonium tetrakis(pentafluorophenyl)borate and tri (2,6-dimethylphenyl)phosphonium tetrakis (pentafluorophenyl)borate, may be mentioned.

In the supported metallocene catalyst of one embodiment, the mass ratio of the metallocene compound and the carrier may be 1:10 to 1:1000. When the carrier and the metallocene compounds are included at the above mass ratio, optimum shape may be exhibited.

And, the mass ratio of the cocatalyst compound and the carrier may be 1:1 to 1:100. When the cocatalyst and the carrier are included at the above mass ratio, activity and polymer fine structure may be optimized.

The supported metallocene catalyst of one embodiment itself may be used for the polymerization of olefin monomers. And, the supported metallocene catalyst may be subjected to a contact reaction with olefin monomers and prepared as a pre-polymerized catalyst, and for example, the catalyst may be separately contacted with olefin monomers such as ethylene, propylene, 1-butene, 1-hexene, 1-octene, and the like and prepared as a pre-polymerized catalyst.

Meanwhile, the supported metallocene catalyst of one embodiment may be prepared by a method comprising steps of: supporting a cocatalyst in a carrier; and supporting a metallocene compound in the carrier where the cocatalyst is supported.

In the above method, supporting conditions are not specifically limited, and it may be conducted under conditions well known to a person having ordinary knowledge in the art. For example, high temperature supporting and low temperature supporting may be appropriately used, and for example, the supporting temperature may be about −30° C. to 150° C., preferably room temperature (about 25° C.) to about 100° C., more preferably room temperature to about 80° C. The supporting time may be appropriately controlled according to the amount of the metallocene compounds to be supported. The reacted supported catalyst may be used as it is, after filtering or vacuum distilling a reaction solvent to remove, and if necessary, it may be soxhlet filtered with aromatic hydrocarbon such as toluene.

And, the supported catalyst may be prepared under solvent or non-solvent. As the solvent that can be used, aliphatic hydrocarbon solvents such as hexane or pentane, aromatic hydrocarbon solvents such as toluene or benzene, hydrocarbon solvents substituted with chlorine atom such as dichloromethane, ether-based solvents such as diethylether or THF, acetone, ethylacetate, and the like may be mentioned, and hexane, heptanes, toluene or dichloromethane may be preferably used.

And, the olefin monomers may be one or more selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosens, norbornene, norbornadiene, ethylidene norbordene, phenyl norbordene, vinyl norbordene, dicylcopentadiene, 1,4-butadiene, 1,5-pentadiene, 1,6-hexadiene, styrene, alpha-methylstyrene, divinylbenzene and 3-chloromethyl styrene.

For the polymerization reaction of olefin monomers, various polymerization processes known as the polymerization reaction of olefin monomers, such as continuous solution polymerization, bulk polymerization, suspension polymerization, slurry polymerization or emulsion polymerization, and the like, may be used. The polymerization reaction may be conducted at a temperature of about 25 to 500° C., or about 25 to 200° C., or about 50 to 150° C., under pressure of about 1 to 100 bar or about 10 to 80 bar.

And, in the polymerization reaction, the supported metallocene catalyst may be used while dissolved or diluted in a solvent such as pentane, hexane, heptanes, nonane, decane, toluene, benzene, dichloromethane, chlorobenzene, and the like. Wherein, the solvent may be treated with a small amount of alkylaluminum to remove a small amount of water or air that may have an adverse influence on the catalyst.

Hereinafter, preferable examples are presented for better understanding of the invention. However, these examples are presented only as the illustrations of the invention and the scope of the invention is not limited thereby.

EXAMPLE

Synthesis Example 1

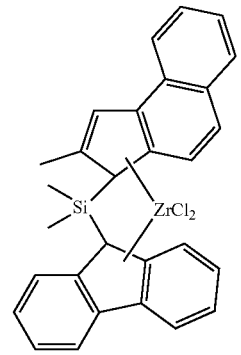

1-1 Preparation of a Ligand Compound

In a 500 mL schlenk flask, under Ar atmosphere, 9.0 g of 2-methylbenzoindene was dissolved in 100 mL of MTBE, and 22 mL of n-BuLi (2.5M in Hex) was slowly added dropwise at −20° C. After stirring at room temperature for 4 hours, completion of reaction was confirmed by NMR, and 100 mL of hexane was introduced. The temperature was lowered to −20° C., and 12.9 g of dichlorodimethylsilane was introduced, and then, the reaction mixture was stirred while slowly raising the temperature to room temperature. After the reaction was completed, all the solvents were distilled and 20 mL of toluene was introduced and stirred.

In a 250 mL Schlenk flask, under Ar atmosphere, 8.3 g of fluorene was dissolved in 100 mL of MTBE. The temperature was lowered to 0° C., and 22 mL of n-BuLi (2.5M in Hex) was slowly added dropwise. After stirring at room temperature for 4 hours, completion of reaction was confirmed by NMR, and then, the solution was introduced in the above 500 mL flask. The reaction mixture was stirred for 16 hours, and then, solid ligand was precipitated.

In order to remove LiCl, 100 mL of water was introduced in the above reactant, and stirred for 10 minutes, and then, an aqueous layer was removed. It was further washed with water twice, and then, solid was filtered from an organic layer to obtain while solid ligand. The organic layer was dried with $MgSO_4$, and the solvent was distilled. 20 mL of hexane was introduced in the remaining solid and stirred, and then, filtered to obtain clean solid ligand (15.5 g, 77%).

1-2 Preparation of a Metallocene Compound

In a 250 mL Schlenk flask, under Ar atmosphere, 1.4 g of the ligand synthesized in 1-1 was introduced, and 45 mL of ether was introduced. 2.9 mL of n-BuLi (2.5M in Hex) was slowly added dropwise at 0° C. The mixture was stirred at room temperature for 4 hours to complete the reaction, and 1.3 g of $ZrCl_4(THF)_2$ was introduced. The mixture was stirred at room temperature for 16 hours, and filtered to obtain solid. 50 mL of DCM was introduced in the solid, stirred at 35° C. for 2 hours, and filtered. After washing with 30 mL of DCM, DCM of the filtrate was distilled to obtain a product (0.45 g, 23%), and the structure was confirmed by H-NMR.

$^1$H-NMR (C6D6 500 MHz): 7.95 (1H, d), 7.91 (1H, d), 7.82 (1H, dd), 7.75 (1H, dd), 7.70 (1H, dd), 7.50-7.60 (3H, m), 7.46 (1H, m), 7.35 (1H, s), 7.30-7.40 (2H, m) 7.24 (1H, m), 7.12 (1H, m), 7.05 (1H, m), 2.38 (3H, s), 1.56 (3H, s), 1.42 (3H, s)

Synthesis Example 2

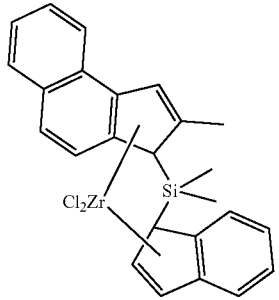

1-1 Preparation of a Ligand Compound

In a 500 mL schlenk flask, under Ar atmosphere, 9.0 g of 2-methylbenzoindene was dissolved in 100 mL of MTBE, and 22 mL of n-BuLi (2.5M in Hex) was slowly added dropwise at −20° C. After stirring at room temperature for 4 hours, completion of reaction was confirmed by NMR, and 100 mL of hexane was introduced. The temperature was lowered to −20° C., and 12.9 g of dichlorodimethylsilane was introduced, and then, the reaction mixture was stirred while slowly raising the temperature to room temperature. After the reaction was completed, all the solvents were distilled and 20 mL of MTBE was introduced and stirred.

In a 250 mL Schlenk flask, under Ar atmosphere, 5.8 g of indene was dissolved in 100 mL of MTBE. The temperature was lowered to 0° C., and 22 mL of n-BuLi (2.5M in Hex) was slowly added dropwise. After stirring at room temperature for 4 hours, completion of reaction was confirmed by NMR, and then, the solution was introduced in the above 500 mL flask. The reaction mixture was stirred for 16 hours, and then, worked-up with water and ether, and dried with $MgSO_4$ to obtain ligand.

1-2 Preparation of a Metallocene Compound

In a 250 mL Schlenk flask, under Ar atmosphere, 6.2 g of the ligand synthesized in 2-1 was introduced, and 45 mL of MTBE was introduced. 14.9 mL of n-BuLi (2.5M in Hex) was slowly added dropwise at 0° C. The mixture was stirred at room temperature for 4 hours to complete the reaction, and 6.7 g of $ZrCl_4(THF)_2$ was introduced in toluene (80 mL) slurry. The mixture was stirred at room temperature for 16 hours, and filtered to obtain solid. The solid was dissolved in 100 mL of DCM and filtered to remove LiCl. The solvent of the filtrate was distilled to obtain a solid product (2.5 g, 27%), and the structure was confirmed by H-NMR.

$^1$H-NMR (C6D6 500 MHz): mixture of Diastereomers A, B
8.00 (1H, m), 7.58-7.75 (2H, m), 7.45-7.52 (3H, m), 7.30-7.40 (2H, m), 7.10-7.22 (3H, m), 6.85-6.98 (1, m), 6.22 (1H of form A, d), 6.18 (1H of form B, d), 2.41 (3H of form A, s), 2.30 1.56 (3H of form B, s), 1.38 (3H of form A, s), 1.24 (3H of form B, s), 1.20 (3H of form B, s), 1.10 (3H of form A, s)

Synthesis Example 3

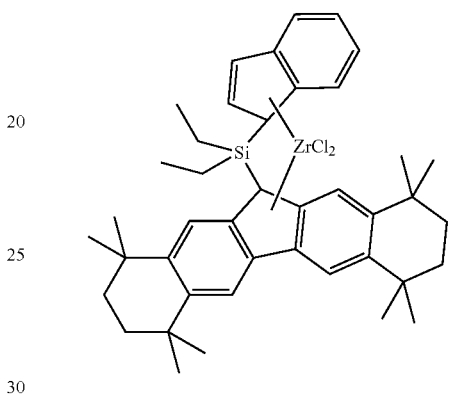

3-1 Preparation of a Ligand Compound

In a 500 mL schlenk flask, under Ar atmosphere, 11.6 g of octamethyl fluorene (1,1,4,4,7,7,10,10-Octamethyl-2,3,4,7, 8,9,10,12-octahydro-1H-dibenzo[b, h]fluorene) was dissolved in 120 mL of MTBE, and 13.2 mL of n-BuLi (2.5M in Hex) was slowly added dropwise at 0° C. After stirring at room temperature for 4 hours, completion of reaction was confirmed by NMR, the temperature was lowered to 0° C., and 4.71 g of dichlorodiethylsilane was introduced, and then, the mixture was stirred while slowly raising the temperature to room temperature.

In a 250 mL Schlenk flask, under Ar atmosphere, 3.5 g of indene was dissolved in 45 mL of MTBE. The temperature was lowered to 0° C., and 13.2 mL of n-BuLi (2.5M in Hex) was slowly added dropwise. After stirring at room temperature for 4 hours, completion of reaction was confirmed by NMR, and then, the solution was introduced in the above 500 mL flask. After reaction at room temperature for 16 hours, it was worked-up with water and ether, and dried with $MgSO_4$ to obtain ligand.

3-2 Preparation of a Metallocene Compound

In a 250 mL Schlenk flask, under Ar atmosphere, 5.9 g of the ligand synthesized in 3-1 was introduced, and 100 mL of MTBE was introduced. 8.4 mL of n-BuLi (2.5M in Hex) was slowly added dropwise at 0° C. The mixture was stirred at room temperature for 4 hours to complete the reaction, and 3.78 g of $ZrCl_4(THF)_2$ was introduced. The mixture was stirred at room temperature for 16 hours, and filtered to remove LiCl. The solvent of the filtrate was distilled, and 40 mL of hexane was introduced, and then, the product was precipitated in the form of red solid. It was filtered to obtain solid (2.43 g, 33%), and the structure was confirmed by H-NMR.

$^1$H-NMR (C6D6 500 MHz): 8.17 (1H, s), 8.08 (1H, s), 7.62 (1H, s), 7.53 (1H, d), 7.46 (1H, s), 7.17 (1H, d), 6.88 (1H, dd), 6.70 (1H, s), 6.66 (2H, dd) 5.86 (1H, s), 1.80-1.95

(2H, dq), 1.76-1.60 (2H, dq), 1.67-1.60 (2H, m), 1.60-1.53 (4H, m), 1.53 (3H, s), 1.53-1.51 (2H, m), 1.36 (3H, t), 1.35 (3H, t), 1.34 (3H, s), 1.32 (3H, s), 1.29 (3H, s), 1.28 (3H, s), 1.27 (3H, s), 1.19 (3H, s), 1.77 (3H, s)

Comparative Synthesis Example 1

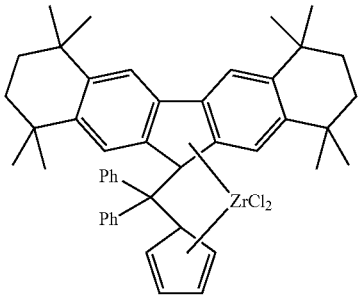

1-1 Preparation of a Ligand Compound

In a 250 mL Schlenk flask, octamethylfluorene and MTBE were introduced and stirred to dissolve. n-BuLi was introduced at −78° C., and the mixture was stirred at room temperature for 4 hours. Diphenyl fulvene and MTBE were introduced in a 250 mL Schlenk flaks and dissolved, and the above lithiated solution was slowly added dropwise at −78° C. The mixture was stirred for 16 hours while raising the temperature to room temperature. It was extracted with diethyl ether and NH₄Cl to separate an organic layer, and it was filtered to obtain solid ligand in the form of pale yellow powder.

1-2 Preparation of a Metallocene Compound

In a 100 mL schlenk flask, the ligand (3.5 g, 5.7 mmol) in the form of pale yellow powder was dissolved in MTBE (40 mL, 0.14 M). n-BuLi was introduced at −78° C. and the mixture was stirred at room temperature overnight to obtain orange slurry. Completion of lithiation was confirmed by H-NMR, the mixture was cooled to 78° C. and ZrCl₄ was introduced, and stirred at room temperature overnight to obtain reddish-pink slurry. Disappearance of ligand was confirmed by H-NMR, and the slurry was filtered with a glass filter to remove LiCl. The solvent of the hot pink solution was removed by pressure reduction, and it was substitution distilled with toluene (20 mL) to additionally remove MTBE. Precipitate was obtained with toluene (~50 mL) and n-hexane (50 mL), and filtered. Fluorescent pink powder (1.4 g, 1.8 mmol, 32% yield) was obtained as a filter cake, and the structure was confirmed by H-NMR.

¹H-NMR (C6D6 500 MHz): 8.41 (2H, s), 7.75 (2H, d), 7.70 (2H, d), 6.94-7.18 (6H, m), 6.42 (2H, s), 6.22 (2H, s), 5.68 (2H, s), 1.62 (8H, m), 1.52 (3H, s), 1.35 (3H, s), 1.07 (3H, s), 1.01 (3H, s); (CDCl3 500 MHz): 8.07 (2H, s), 7.96 (2H, d), 7.86 (2H, d), 7.46 (2H, t), 7.34 (2H, t), 6.29 (2H, s), 6.20 (2H, s), 5.57 (2H, s), 1.67 (4H, m), 1.61 (4H, m), 1.48 (6H, s), 1.42 (6H, s), 0.95 (6H, s), 0.83 (6H, s).

Comparative Synthesis Example 2

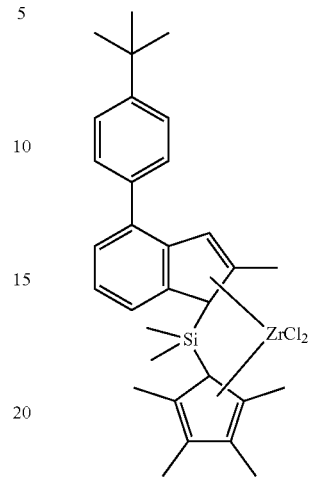

2-1 Preparation of a Ligand Compound

In a dried 250 mL schlenk flask, 2.724 g (10.4 mmol) of 4-(4-(tert-butyl)phenyl)-2-isopropyl-1H-indene was introduced, and 30 ml of diethylether was introduced under argon. The diethylether solution was cooled to 0° C., and then, 4.8 mL (12 mmol) of a 2.5 M nBuLi hexane solution was slowly added dropwise. The temperature of the reaction mixture was slowly raised to room temperature, and then, stirred until the next day. 2.230 g (10.4 mmol) of chlorodimethyl(2,3,4,5-tetramethylcyclopenta-2,4-dien-1-yl)silane previously synthesized and 50 ml of THF were added dropwise thereto, and the mixture was stirred for a day, and then, 50 ml of water was introduced in the flask to quench, and an organic layer was separated and dried with MgSO₄. As the result, 4.902 g (10.12 mmol, 97.5% Yield) of oil was obtained. Purity by NMR (wt %)=90.99% (impurity THF) Mw=440.752

2-2 Preparation of a Metallocene Compound

In an oven-dried 250 mL schlenk flask, the ligand was introduced and dissolved in 70 ml of MTBE, and then, 2.1 equivalents of a nBuLi solution (21 mmol, 8.5 ml) was added to lithiate until the next day. In a glove box, one equivalent of ZrCl₄(THF)₂ was taken and put in a 250 ml schlenk flask, and ether was introduced to prepare a suspension. Both flasks were cooled to −20° C., and then, the ligand anion was slowly added to the Zr suspension. After the addition was completed, the temperature of the reaction mixture was slowly raised to room temperature. It was stirred for a day, and then, MTBE in the mixture was filtered with Schlenk Filter under argon, the filtrate was discarded, and a filter cake in the form of yellow solid was taken. In order to remove LiCl in the filter cake, it was dissolved in DCM, followed by filtering and pressure reduction to remove the solvent, thus securing 1.079 g of a catalyst precursor. Purity by NMR (wt %)=100%. Mw=600.85. Yield 17.7%

¹H-NMR (C6D6 500 MHz): 7.947 (2H d), 7.406 (2H d), 7.389 (2H, d), 7.253 (1H, s), 6.899 (1H, dd), 2.051 (3H, s), 1.978 (3H, s), 1.893 (3H, s), 1.880 (3H, s), 1.792 (3H, s), 1.235 (9H, s), 0.779 (3H, s), 0.649 (3H, s)

Preparation Example of Supported Metallocene Catalyst

Preparation Example 1

(1) Preparation of a Carrier
Silica (SP 952, product by Grace Davision) was dehydrated and dried at 600° C. for 12 hours under vacuum.
(2) Preparation of Carrier in which Cocatalyst is Supported
20 g of the dried silica was put in a glass reactor, a solution of methylaluminoxane (MAO) containing 13 mmol of aluminum in toluene was added, and the reaction mixture was stirred at 40° C. for 1 hour to slowly react. After the reaction was completed, it was washed with a sufficient amount of toluene several times until unreacted aluminum compound was completely removed, and the remaining toluene was removed by pressure reduction at 50° C. As the result, 32 g of a carrier in which a cocatalyst is supported (MAO/SiO$_2$) was obtained (Al content in the supported catalyst=17 wt %).
(3) Preparation of a Supported Catalyst
12 g of the above-prepared carrier in which a cocatalyst is supported (MAO/SiO$_2$) was put in a glass reactor, and then, 70 mL of toluene was added and stirred. A solution prepared by dissolving the compound (0.20 mmol) prepared in Synthesis Example 1 in toluene was added to the glass reactor, and reacted under stirring at 40° C. for 2 hours. And then, the reaction product was washed with a sufficient amount of toluene, and then, vacuum dried to obtain a supported metallocene catalyst in the form of solid powder.

Preparation Example 2

A supported metallocene catalyst was prepared by the same method as Preparation Example 1, except that the metallocene compound of Synthesis Example 2 was used instead of the metallocene compound of Synthesis Example 1.

Preparation Example 3

A supported metallocene catalyst was prepared by the same method as Preparation Example 1, except that the metallocene compound of Synthesis Example 3 was used instead of the metallocene compound of Synthesis Example 1.

Comparative Preparation Example 1

A supported metallocene catalyst was prepared by the same method as Preparation Example 1, except that the metallocene compound of Comparative Synthesis Example 1 was used instead of the metallocene compound of Synthesis Example 1.

Comparative Preparation Example 2

A supported metallocene catalyst was prepared by the same method as Preparation Example 1, except that the metallocene compound of Comparative Synthesis Example 2 was used instead of the metallocene compound of Synthesis Example 1.

Preparation Example of Polyolefin

Example 1

In a dry box, the supported catalyst (7 mg) prepared in Preparation Example 1 was weighed and put in a 30 mL glass bottle, and then, it was sealed with a rubber septum, and taken out of the dry box to prepare a catalyst to be introduced. Polymerization was conducted in a 0.6 L Parr high pressure reactor equipped with a mechanical stirrer, which can be temperature-controlled, and can be used under high pressure.
Into the reactor, 0.26 kg of hexane and 0.5 g of TIBAL (1M in Hexane) were introduced. The supported catalyst (7 mg) of Preparation Example 1 was introduced into the reactor as hexane slurry, and while stirring at 500 rpm, the temperature was raised to 80° C. When the internal temperature reached 80° C., internal pressure was removed and 10 mL of 1-hexene was introduced. While stirring at 500 rpm under 30 bar of ethylene pressure, reaction was progressed for 1 hour. After the reaction was completed, obtained polymer was filtered to first remove hexane, and then, dried in a 80° C. oven for 3 hours to obtain ethylene-1-hexene copolymer.

Example 2

Ethylene-1-hexene copolymer was prepared by the same method as Example 1, except that the metallocene supported catalyst of Preparation Example 2 was used instead of the metallocene supported catalyst of Preparation Example 1.

Example 3

Ethylene-1-hexene copolymer was prepared by the same method as Example 1, except that the metallocene supported catalyst of Preparation Example 3 was used instead of the metallocene supported catalyst of Preparation Example 1.

Comparative Example 1

Ethylene-1-hexene copolymer was prepared by the same method as Example 1, except that the metallocene supported catalyst of Comparative Preparation Example 1 was used instead of the metallocene supported catalyst of Preparation Example 1.

Comparative Example 2

Ethylene-1-hexene copolymer was prepared by the same method as Example 1, except that the metallocene supported catalyst of Comparative Preparation Example 2 was used instead of the metallocene supported catalyst of Preparation Example 1.

Experimental Example

For the polyolefins prepared in Examples and Comparative Examples, the properties were measured as follows, and the results were shown in the following Table 1.
(1) SCB (short chain branch): The kind and number (per 1000 carbons) of C6 or less side branches introduced in polyolefin were analyzed through 1H NMR. Wherein, the polymer sample was dissolved in a solvent of 1,1,2,2-tetrachloroethane-d2 at high temperature, and then, analyzed at 120° C., and Bruker AVANCEIII 500 MHz NMR/BBO Prodigy Cryo probe was used.
Bruker AVANCEIII 500 MHz NMR/BBO Prodigy Cryo probe: 1H NMR (120° C.), D-solvent: TCE-d2.
(2) ASL (Average Ethylene Sequence Length)
Using Differential Scanning calorimeter (device name: DSC8000, Manufacturing company: PerkinElmer), polyolefin was initially heated to 160° C., and maintained for 30 minutes, thus removing heat history before measuring the sample.

The temperature was decreased from 160° C. to 122° C. and maintained for 20 minutes, decreased to 30° C. and maintained for 1 minute, and then, increased again. Next, after heating to a temperature (117° C.) 5° C. lower than the initial heating temperature of 122° C., the temperature was maintained for 20 minutes, decreased to 30° C. and maintained for 1 minute, and then, increased again. In this way, while gradually decreasing the heating temperature at the same maintenance time and cooling temperature with (n+1)th heating temperature being 5° C. lower than nth heating temperature, the above process was repeated until the final heating temperature became 52° C. Wherein, the temperature increase and decrease speeds were respectively controlled to 20° C./min. Finally, while increasing the temperature from 30° C. to 160° C. at a temperature rise speed of 10° C./min, calory change was observed to measure SSA thermogram.

(3) Block Comonomer Distribution Index (BCDI)

Each ASL according to length (<8 nm, >30 nm, 8~30 nm) calculated in (2) was substituted in the following Formula 1 to calculate block comonomer distribution index (BCDI):

$$BCDI = \frac{ASLfi(<8\ nm) + ASLfi(>30\ nm)}{ASLfi(8 \sim 30\ nm)} \quad \text{[Formula 1]}$$

in the Formula 1,

ASL fi(<8 nm) is the fraction (%) of chains having ASL (Average Ethylene Sequence Length) less than 8 nm, by SSA (Successive Self-nucleation and Annealing) analysis, ASL fi(>30 nm) is the fraction (%) of chains having ASL greater than 30 nm, by SSA analysis, and ASL fi(8~30 nm) is the fraction (%) of chains having ASL of 8 to 30 nm, by SSA analysis.

(4) Weight Average Molecular Weight (Mw, g/Mol)

Agilent mixed B column was used, Waters alliance 2695 equipment was used, the evaluation temperature was 40° C., tetrahydrofuran was used as a solvent, flow rate was 1.0 mL/min, and a sample was prepared at the concentration of 1 mg/1 mL, and then, supplied in an amount of 100 μl, and using a calibration curve formed using polystyrene standards, Mw was calculated. The molecular weights of polystyrene standards were 2,000/10,000/30,000/70,000/200,000/700,000/2,000,000/4,000,000/10,000,000.

(5) Melting Temperature (Tm, ° C.)

The melting temperature was obtained using DSC (Differential Scanning calorimeter 6000) manufactured by PerKinElmer. Namely, after raising temperature to 200° C., it was maintained at that temperature for 1 minute, and then, the temperature was decreased to −100° C., and then, the temperature was increased again, and the top of DSC curve was determined as a melting point. Wherein, the temperature increase and decrease speeds are 10° C./min, and the melting point is obtained during the second temperature rise.

(6) Density (g/Cm³): Measured According to ASTM D1505 Standard.

A graph showing the relation between the SCB contents and BCDIs of polyolefins according to Examples and Comparative Examples was shown in FIG. 1.

Figure 2:
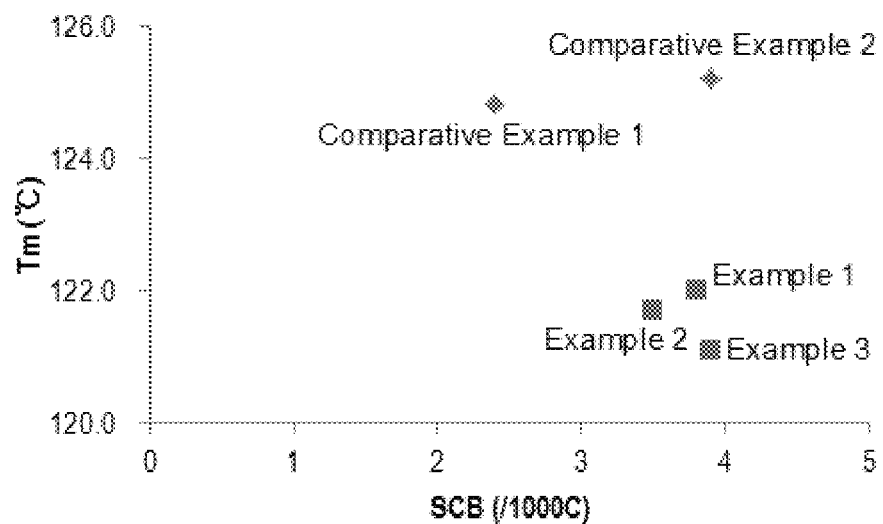
FIG. 2 is a graph showing the relation between the SBC contents and melting temperatures of polyolefins according to Examples of the invention and Comparative Examples.

And, a graph showing the relation between the SCB contents and melting points (Tm) of polyolefins according to Examples and Comparative Examples was shown in FIG. 2.

TABLE 1

|  | ASL fraction(%) less than 8 nm | ASL fraction(%) of 8-30 nm | ASL fraction(%) greater than 30 nm | BCDI | SCB (number/ 1000 C) | Mw (g/mol) | Tm (° C.) | density (g/cm³) |
|---|---|---|---|---|---|---|---|---|
| Example 1 | 19.2 | 61.9 | 18.9 | 0.61 | 3.8 | 245,000 | 122.0 | 0.919 |
| Example 2 | 18.3 | 66.8 | 14.9 | 0.50 | 3.5 | 379,000 | 121.7 | 0.918 |
| Example 3 | 19.3 | 58.7 | 22.0 | 0.70 | 3.69 | 348,000 | 121.1 | 0.919 |
| Comparative Example 1 | 14.8 | 40.4 | 44.8 | 1.48 | 2.4 | 863,000 | 124.8 | 0.928 |
| Comparative Example 2 | 15.4 | 45.0 | 39.6 | 1.22 | 3.9 | 214,000 | 125.0 | 0.928 |

Referring to Table 1, FIGS. 1, and 2, it can be seen that the polyolefins of Examples 1 to 3 of the invention have low density and melting temperature, compared to Comparative Examples 1 to 2 having similar SCB contents.

What is claimed is:

1. A polyolefin having
a density of 0.910 g/cm³ to 0.930 g/cm³;
SCB (Short Chain Branch) per 1000 carbons of 1.0 to 5.0; and
a block comonomer distribution index (BCDI) calculated by Formula 1 of 1.0 or less:

$$BCDI = \frac{ASLfi(<8\ nm) + ASLfi(>30\ nm)}{ASLfi(8 \sim 30\ nm)} \quad \text{[Formula 1]}$$

in Formula 1,

ASL fi (<8 nm) is fraction (%) of chains having ASL (Average Ethylene Sequence Length) less than 8 nm, by SSA (Successive Self-nucleation and Annealing) analysis, ASL fi (>30 nm) is fraction (%) of chains having ASL greater than 30 nm, by the SSA analysis, and ASL fi (8~30 nm) is fraction (%) of chains having ASL of 8 to 30 nm, by the SSA analysis, wherein the SSA analysis is conducted using differential scanning calorimeter, by heating the polyolefin to a first heating temperature of 120 to 124° C., maintaining for 15 to 30 minutes, and then, cooling to 28 to 32° C., and while decreasing heating temperature by stages with (n+1)th heating temperature being 3 to 7° C. lower than nth heating temperature, and repeating heating-annealing-quenching until a final heating temperature becomes 50 to 54° C., wherein the polyolefin is a copolymer comprising a unit derived from ethylene, and wherein the polyolefin has a melting point (Tm) of 120 to 124° C.

2. The polyolefin according to claim 1, wherein the polyolefin has weight average molecular weight (Mw) of 100,000 to 500,000 g/mol.

3. The polyolefin according to claim 1, wherein the ASL fi (8~30 nm) is 51% to 75%.

4. The polyolefin according to claim 1, wherein the polyolefin is a copolymer of the ethylene and an alpha olefin.

5. The polyolefin according to claim 1, wherein the alpha olefin comprises one or more of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbordene, phenyl norbordene, vinyl norbordene, dicyclopentadiene, 1,4-butadiene, 1,5-pentadiene, 1,6-hexadiene, styrene, alpha-methyl styrene, divinylbenzene, or 3-chloromethyl styrene.

6. The polyolefin according to claim 4, wherein the polyolefin is prepared by polymerizing the ethylene and alpha olefin, in the presence of a supported metallocene catalyst comprising a metallocene compound represented by Chemical Formula 1; and a carrier supporting the metallocene compound:

[Chemical Formula 1]

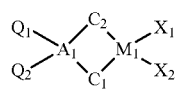

in Chemical Formula 1, $M_1$ is a Group 4 transition metal;

$A_1$ is carbon (C), silicon (Si), or germanium (Ge);

$Q_1$ and $Q_2$ are identical to or different from each other, and each independently, hydrogen, halogen, $C_{1-20}$ alkyl, $C_{2-20}$ alkenyl, $C_{2-20}$ alkoxyalkyl, $C_{7-40}$ aryloxyalkyl, $C_{6-40}$ aryl, $C_{7-40}$ alkylaryl, or $C_{7-40}$ arylalkyl;

$X_1$ and $X_2$ are identical to or different from each other, and each independently, halogen, $C_{1-20}$ alkyl, $C_{2-20}$ alkenyl, $C_{6-40}$ aryl, a nitro group, an amido group, $C_{1-20}$ alkylsilyl, $C_{1-20}$ alkoxy, or $C_{1-20}$ sulfonate group;

$C_1$ and $C_2$ are identical to or different from each other, and each independently, represented by one of Chemical Formula 2a, 2b, or 2c,

[Chemical Formula 2a]

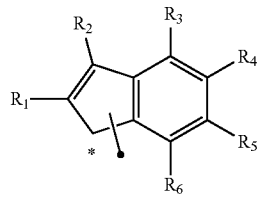

[Chemical Formula 2b]

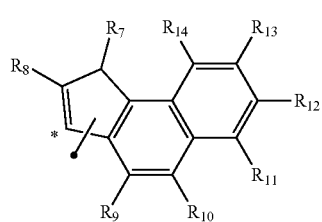

[Chemical Formula 2c]

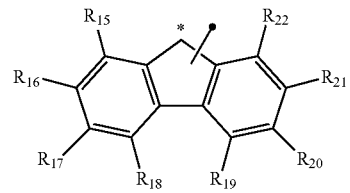

in Chemical Formulas 2a, 2b, and 2c, $R_1$ to $R_{22}$ are identical to or different from each other, and each independently, hydrogen, halogen, $C_{1-20}$ alkyl, $C_{1-20}$ haloalkyl, $C_{2-20}$ alkenyl, $C_{1-20}$ alkylsilyl, $C_{1-20}$ silylalkyl, $C_{1-20}$ alkoxysilyl, $C_{1-20}$ alkoxy, $C_{6-40}$ aryl, $C_{7-40}$ alkylaryl, or $C_{7-40}$ arylalkyl, and two or more neighboring groups of $R_{15}$ to $R_{22}$ are optionally connected with each other to form a substituted or unsubstituted aliphatic or aromatic ring;

* represents a site binding to $A_1$, and
· represents a site binding to $M_1$.

7. The polyolefin according to claim 6, wherein the metallocene compound is represented by any one of the following structural formulas:

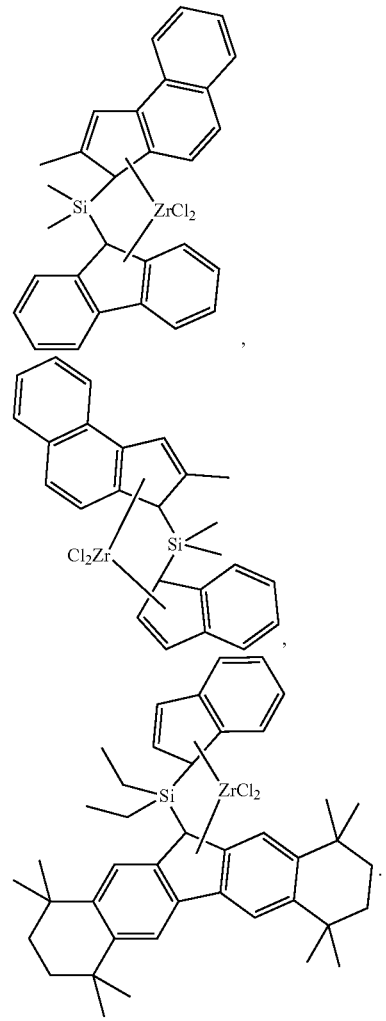

8. The polyolefin according to claim 1, wherein the ASL fi (<8 nm) is 14% to 23%.

9. The polyolefin according to claim 1, wherein the ASL fi (>30 nm) is 14% to 28%.

* * * * *